United States Patent [19]

DuBuske

[11] 4,321,100

[45] Mar. 23, 1982

[54] METHOD OF JOINING BORON NITRIDE TO A REFRACTORY

[75] Inventor: Stanley DuBuske, Lincroft, N.J.

[73] Assignee: The United States of America as represented by the Secretary of the Army, Washington, D.C.

[21] Appl. No.: 247,567

[22] Filed: Mar. 25, 1981

[51] Int. Cl.$^3$ .................... C03B 29/00; C04B 33/34; C04B 37/00
[52] U.S. Cl. .................................... 156/89; 428/688; 428/699; 428/472
[58] Field of Search ............... 428/688, 699, 472, 539, 428/448; 156/89; 427/190

[56] References Cited

U.S. PATENT DOCUMENTS 3,916,075  10/1975  Dimigen et al. .................... 428/472
4,104,096  8/1978  Gass et al. ........................... 428/472

Primary Examiner—Shrive P. Beck
Attorney, Agent, or Firm—Nathan Edelberg; Robert P. Gibson; Roy E. Gordon

[57] ABSTRACT

Boron nitride is joined to a refractory at high temperatures by coating a surface of the boron nitride with a mixture of paintable consistency of molybdenum disilicide and polyisobutyl methacrylate in an organic solvent, allowing the coated boron nitride surface to air dry, and placing the refractory in contact with the coated boron nitride surface and firing at a temperature above 1500° C. in an inert atmosphere.

9 Claims, No Drawings

METHOD OF JOINING BORON NITRIDE TO A REFRACTORY

The invention described herein may be manufactured, used, and licensed by or for the Government for governmental purposes without the payment to me of any royalty thereon.

This invention relates in general to a method of joining boron nitride to other materials, and in particular, to a method of joining boron nitride to a refractory at high temperatures.

BACKGROUND OF THE INVENTION

It is known that boron nitride has excellent dielectric properties that would be useful in electronic equipments and devices. A major difficulty, however, has been in achieving a satisfactory bond to a metal conductor, and particularly when high temperature applications have been involved and where lower temperature joining techniques would not work.

SUMMARY OF THE INVENTION

The general object of this invention is to provide a method of joining boron nitride to other materials. A more particular object of the invention is to provide such a method for joining boron nitride to a refractory at high temperatures.

It has now been found that the foregoing objects can be attained and boron nitride joined to a refractory by coating a surface of the boron nitride with a mixture of paintable consistency of molybdenum disilicide and polyisobutyl methacrylate in an organic solvent, allowing the coated boron nitride surface to air dry, and placing the refractory in contact with the coated boron nitride surface and firing at a temperature above 1500° C. in an inert atmosphere.

The term "refractory" as used herein refers to any material that is slow to melt and resists the action of heat such as brick, silicon carbide, fire clay, silica, sillimanite, magnesite, molybdenum, tantalum, vanadium, tungsten, and boron nitride.

DESCRIPTION OF THE PREFERRED EMBODIMENT

A boron nitride fixture is joined to a silicon carbide element by coating a surface of the boron nitride with a mixture of paintable consistency of molybdenum disilicide and polyisobutyl methacrylate in acetone. The coated boron nitride surface is allowed to air dry in an electric furnace at about 90° to 120° C. Then, the silicon carbide element is placed in contact with the coated boron nitride surface and fired at about 2000° C. in an argon atmosphere. The resulting silicon carbide-boron nitride joint was so strong that it could only be cut apart by chiseling.

In the foregoing description, in lieu of acetone as the solvent one might use other organic solvents such as xylene.

The coated substrate can also be allowed to air dry under a heat lamp. (infra-red).

I wish it to be understood that I do not desire to be limited to the exact details described, for obvious modifications will occur to a person skilled in the art.

What is claimed is:

1. Method of joining boron nitride to a refractory at high temperatures, said method including the steps of
   (A) coating a surface of the boron nitride with a mixture of paintable consistency of molybdenum disilicide and polyisobutyl methacrylate in an organic solvent,
   (B) allowing the coated boron nitride surface to air dry, and
   (C) placing the refractory in contact with the coated boron nitride surface and firing at a temperature about 1500° C. in an inert atmosphere.

2. Method according to claim 1 wherein the refractory is selected from the group consisting of molybdenum, tantalum, vanadium, tungsten, boron nitride, brick, silicon carbide, silica, sillimanite, and magnesite.

3. Method according to claim 1 wherein the refractory is silicon carbide.

4. Method according to claim 2 wherein the refractory is boron nitride.

5. Method according to claim 1 wherein the organic solvent is selected from the group consisting of xylene and acetone.

6. Method according to claim 5 wherein the organic solvent is xylene.

7. Method according to claim 5 wherein the organic solvent is acetone.

8. Method according to claim 1 wherein the firing in Step (C) is at about 2000° C.

9. Method of joining a boron nitride fixture to a silicon carbide element, said method consisting of coating a surface of boron nitride with a mixture of paintable consistency of molybdenum disilicide and polyisobutyl methacrylate in acetone, allowing the coated boron nitride surface to air dry in an electric furnace at about 90° to 120° C., and placing the silicon carbide element in contact with the coated boron nitride surface and firing at about 2000° C. in an argon atmosphere.

* * * * *